United States Patent Office 3,513,595
Patented May 26, 1970

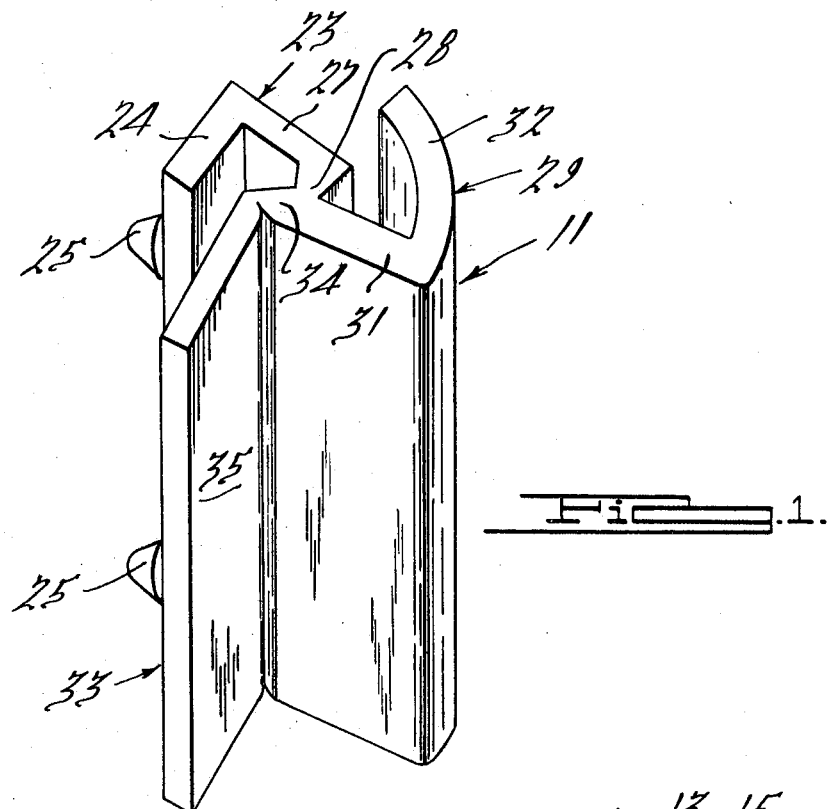
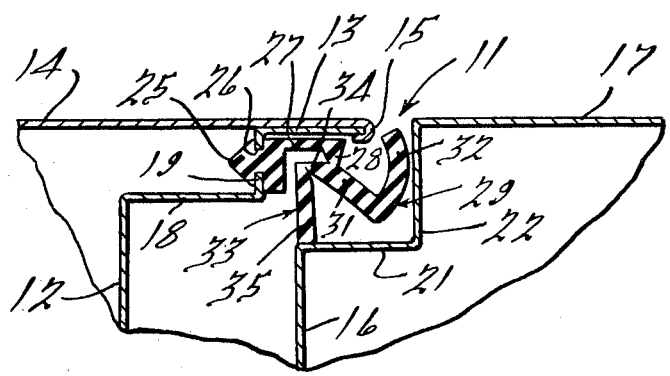
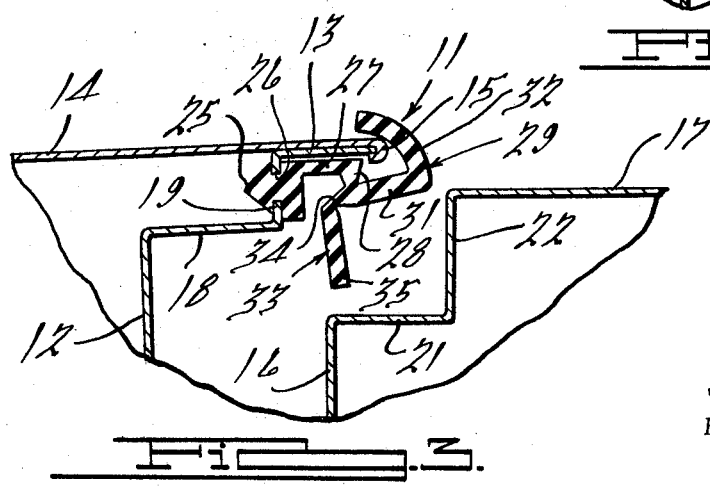

---

3,513,595
DOOR EDGE GUARD
John C. Mills, St. Clair Shores, Mich., assignor to Ford Motor Company, Dearborn, Mich., a corporation of Delaware
Filed Dec. 6, 1967, Ser. No. 688,478
Int. Cl. B60j 5/100
U.S. Cl. 49—462                              1 Claim

ABSTRACT OF THE DISCLOSURE

A unitary door edge guard of a resilient plastic material preformed to have a protective portion adapted to project over the hem flange edge of the free edge wall of a vehicle door in an opened position of the latter. Pressure transmitting means engageable with a vehicle body member causes retraction of the protective portion to a concealed position behind the hem flange of the door in closed position of the latter.

BACKGROUND OF THE INVENTION

It is rare in urban areas to find a vehicle that does not have a plurality of minute identations in the body side and door panels. It is most difficult in a congested parking lot to open a vehicle door with enough finesse to avoid banging the door edge into the vehicle parked alongside. For one thing, the conventional combination door check and hold open device usually operates in a sequence of steps. These devices usually include spring loaded components which cause the door to move in a series of jerky movements as each step is overcome.

Molding strip type edge guards are available that are primarily for the purpose of protecting the edge of the vehicle door being swung to an open position rather than to protect the panel of an adjacent vehicle which may be in the path of the swinging door. These molding strip types of door edge guards are usually manufactured of metal since plastic guards, which would have a cushioning effect, have a tendency to fall off the door when temperatures are high or to break when temperatures are low. Attempts have been made to devise retractable door edge guards or door bumpers for vehicles, such as shown in U.S. Pats. 2,678,232 and 3,243,222. Devices of this type usually rather complex and require operating mechanisms which run afoul of the space requirements for window regulators, door latch mechanisms and other accessories to be found within the doors of modern vehicles.

Accordingly, it is the object of the present invention to provide a nonmechanical unitary door edge guard made of a resilient plastic material which is adapted to automatically cover the door edge to provide a cushion between the latter and the body panel of an adjacently parked vehicle. The unitary door edge guard is constructed and arranged to be self-storing when the vehicle door in which it is mounted is in a closed position.

SUMMARY OF THE INVENTION

The present invention relates to a unitary door edge of a resilient plastic material for the hem flange edge of the free edge wall of a vehicle door hingedly mounted on a vehicle body. The edge guard comprises a base portion, a door edge protective portion, and integral hinge means connecting the protective portion to the base portion. The base portion, protective portion and integral hinge portion are manufactured in a free formed resilient angular relationship to each other so that when mounted on the vehicle door the protective portion normally projects over the hem flange edge of the door when the base portion is mounted on the door surface adjacent the inner face of the hem flange. The unitary edge guard includes a pressure transmitting means coupled to the hinge means and operative to flex the protective portion into a retracted position relative to the hem flange edge upon engagement of the pressure transmitting means with a part of the vehicle door in a closed position of the vehicle door. The protective portion is self-restoring to a hem flange edge protective position upon disengagement of the pressure transmitting means from the vehicle body upon the door being opened.

DESCRIPTION OF THE DRAWING

Other objects, advantages and features of the present invention will be made more apparent as this description proceeds, reference being had to the accompanying drawings, wherein:

FIG. 1 is a perspective view of a door edge guard embodying the present invention;

FIG. 2 is a sectional diagrammatic view illustrating the door edge guard operatively mounted on a vehicle door and shown in retracted position as it would appear when the vehicle door is closed;

FIG. 3 is a view in part similar to FIG. 2 illustrating the door edge guard as it would appear when the vehicle door is in a partially opened position.

DETAILED DESCRIPTION OF THE INVENTION

Referring now to the drawing, the door edge guard generally designated 11, is molded of a suitable resilient plastic material. Polypropylene or nylon plastics are available that have high tensile strength, the qualities of remaining tough, flexible and resilient over the temperature range normally encountered by vehicle bodies, and the characteristic of having a "memory," i.e., the tendency to return to an unstressed molded condition after having been flexed or distorted.

Before explaining in detail the door edge guard 11, a brief explanation of the environment in which it is used will help to understand its features. The conventional vehicle door is hinged at one end for swinging movement about a substantially vertical hinge axis. The other end of the door comprises a free edge or jamb facing wall 12 which terminates in a hem flange 13 to which the outer panel or outer skin 14 of the door is attached. The terminal edge 15 of the outer panel 14 is usually rolled over the end of the flange 13. In closed position of the door, see FIG. 2, the free edge wall 12 faces an end wall 16 of a body pillar or other structural member framing the body opening in which the door is mounted. The outer panel 14 of the door is aligned with an outer panel 17 of the vehicle body.

Interposed between the end wall 12 and the flange 13 is a short wall 18 substantially normal to the end wall 12 and spaced from panel 14. Wall 18 is joined to flange 13 by a short wall 19 substantially normal to the wall 18.

The corner between the body pillar end wall 16 and the outer panel 17 of the vehicle body is notched or rabbeted as indicated by the two angularly related walls 21 and 22. The wall 21 is substantially normal to the end wall 16 of the body pillar and the wall 22 is substantially normal to the outer body panel 17 of the vehicle body.

The function of the door edge guard 11 is to protect the hem flange edge 15 against damage to itself and damage to the body or door panel of an adjacent vehicle with which it might come in contact when the door of which it forms a part is swung open. It is desirable that the door edge guard 11 be in a concealed position when the door on which it is mounted is in a closed position. The door edge guard 11 of the present invention is constructed and arranged to achieve these functions as follows:

The door edge guard 11 is a unitary device molded of resilient plastic material as explained above. It comprises a base portion 23 which is substantially L-shaped. The base leg 24 of the L-shaped base portion 23 has at least two spaced nibs 25 adapted to be received in complementarily spaced apertures 26 in the wall 19 adjacent the flange 13. The upstanding leg 27 of the base portion 23 is adapted to lie in a substantially parallel relationship to the hem flange 13.

The leg 27 of the base portion 23 terminates in a lateral extension designated the hinge portion 28. The hinge portion 28 extends away from the hem flange 13. This hinge portion 28 supports a door edge protective portion, generally designated 29.

The door edge protective portion 29 comprises a substantially V-shaped channel member one leg 31 of which is substantially flat and the other leg 32 of which is concavely curved relative to the leg 31. The end of the flat leg 31 opposite its juncture with the curved leg 32 is integral with the hinge portion 28. The base portion 23, the door edge protective portion 29 and the integral hinge portion 28 are molded so as to have a preformed resilient angular relationship in which the protective portion 29 normally projects over the hem flange edge 15 of the vehicle door when the base portion 24 is mounted on a door surface, such as the surface of the wall 19, with its upstanding leg 29 paralleling and adjacent the inner face of the hem flange 13 (see FIG. 3). The curved leg 32 of the protective portion 29 is adapted to be retracted from its position overlying the hem flange edge 15 through the integral pressure transmitting means, herein generally designated 33. The pressure transmitting means comprises an extension 34 of the flat leg 31 of the protective portion 29 of the door edge guard. The extension 34 extends laterally from the hinge portion 28 in a direction opposite the leg 31 to which it is attached. At its extremity the extension 34 is coupled to a vehicle body engageable member 35 which is shown as a substantially flat plastic appendage.

As best seen in FIG. 1, the door edge guard 11 is an elongated device, its exact length being a matter of design choice. The operation of the door edge guard may be readily understood with reference to FIGS. 2 and 3.

In FIG. 3, the door edge guard 11 is shown with its door edge protective portion leg 32 overlying the edge 15 of the vehicle door. As indicated above, this is the normal unstressed condition of the door edge guard. FIG. 3 may be considered as showing the door edge guard 11 as it appears immediately after the door is opened and moved slightly away from the body pillar or immediately prior to the door being closed into alignment with the body pillar as shown in FIG. 2. Assuming that the door is being moved into a closed position, the vehicle body engagement member 35 will abut the wall 21 of the vehicle body pillar and cause the door edge protective portion 29 to be bodily rotated about the hinge portion 28. Since the vehicle body engageable member 35 is at one side of the hinge portion 28, it moves the extension 34 of leg 31 of the door edge protective portion toward the upstanding leg 27 of the base portion 23. This results in the flat leg 31 of the door edge protective portion 29 being swung about the hinge portion 28 in a clockwise direction as viewed in FIGS. 2 and 3. As a result, the curved leg 32 of the door edge protective portion 29 is moved into the pocket formed by the pillar walls 21 and 22, the door wall 19 and the hem flange 13. This is the condition shown in FIG. 2. The door edge protective portion is thus protected from the buffeting of the air stream alongside the body panel of the vehicle as the vehicle travels along the highway.

Upon the vehicle door being opened, the door edge guard, because of the memory of the plastic material, is automatically restored to the condition shown in FIG. 2 in which the curved leg 32 overlaps the edge of the door 15. This protects the door edge from being chipped or nicked upon engagement with a building wall or the body panel of an adjacent vehicle and at the same time protects the body panel of an adjacent vehicle from being nicked by the edge 15 of the doors.

Depending on the curvature of the door in which the door edge guard is mounted, one or more of the edge guards may be used and positioned to give optimum protection to the edge of the door.

It is to be understood that this invention is not limited to the exact construction illustrated and described above or in the abstract preceding the specification, but that various changes and modifications may be made without departing from the scope and spirit of the invention as defined in the appended claim.

I claim:

1. A unitary, resilient plastic, door edge guard for the hem flange edge of a free edge wall of a vehicle door hingedly mounted on a vehicle body, comprising:

a substantially L-shaped base portion having a base leg and an upstanding leg, retention means carried by the base leg for attachment of the base portion to a jamb facing wall of a vehicle door with the upstanding leg substantially paralleling the inner surface of the door hem flange;

a door edge protective portion comprising a substantially V-shaped channel member one leg of which is substantially flat and the other leg of which is concavely curved relative to the flat leg;

an integral hinge portion connecting the protective portion to the base portion, said integral hinge portion being laterally connected at one end to the free end of the base portion upstanding leg in substantially parallel relationship to and extending in the same direction as the base portion base leg, said integral hinge portion at its other end being connected to the end of the channel member flat portion opposite the juncture of the latter with the curved leg;

the base portion, the door edge protective portion and the integral hinge portion having a preformed resilient angular relationship in which the protective portion curved leg in door open position projects over the hem flange edge of the door;

and pressure transmitting means comprising an integral longitudinal extension of the flat leg of the protective portion channel member, said longitudinal extension projecting from the point of attachment of the channel member flat portion to the hinge portion toward the base leg of the base portion, and a vehicle body engageable member hingedly attached to the free end of said flat leg integral longitudinal extension and extending away from the upstanding leg of the base portion, said body engageable portion being adapted to be moved by engagement with a vehicle body structure toward the upstanding leg and when so moved to cause said protective portion channel member to swing about the hinge portion to carry the curved leg into a retracted position relative to the hem flange edge, said protective portion and the curved leg thereon being self-restoring to a hem flange edge protective position upon disengagement of the body engageable portion from the vehicle body.

References Cited

UNITED STATES PATENTS

| | | | |
|---|---|---|---|
| 2,267,433 | 12/1941 | Tea | 49—492 |
| 2,678,232 | 5/1954 | Barry | 49—462 |
| 3,167,827 | 2/1965 | Alley | 49—492 |
| 3,380,193 | 4/1968 | Hill | 49—462 |

R. J. JOHNSON, Primary Examiner